(12) United States Patent
Falconer

(10) Patent No.: US 6,745,511 B1
(45) Date of Patent: Jun. 8, 2004

(54) CASTING DEVICE FOR FISHING

(76) Inventor: Leonard Stanley Falconer, 8 Costero Aisle, Irvine, CA (US) 92614

( * ) Notice: Subject to any disclaimer, the term of this patent is extended or adjusted under 35 U.S.C. 154(b) by 22 days.

(21) Appl. No.: 10/193,867

(22) Filed: Jul. 11, 2002

(51) Int. Cl.$^7$ .................. A01K 93/00; A01K 91/02
(52) U.S. Cl. .................. 43/43.15; 43/44.9; 43/44.87
(58) Field of Search ............... 43/43.1, 43.11, 43/43.14, 43.15, 44.87, 44.9, 42.25

(56) References Cited

U.S. PATENT DOCUMENTS

| | | | | |
|---|---|---|---|---|
| 1,611,644 A | * | 12/1926 | Johnson | 43/42.36 |
| 2,163,666 A | * | 6/1939 | Carter et al. | 43/42.36 |
| 2,167,334 A | * | 7/1939 | Hayes | 43/42.36 |
| 2,413,371 A | * | 12/1946 | Parker | 43/43.11 |
| 2,456,254 A | * | 12/1948 | Caruso | 43/43.15 |
| 2,609,633 A | * | 9/1952 | Cracker | 43/42.36 |
| 2,683,323 A | * | 7/1954 | Dudley | 43/42.25 |
| 2,690,027 A | * | 9/1954 | Russell | 43/44.98 |
| 2,734,301 A | * | 2/1956 | Fuqua | 43/44.9 |
| 2,753,650 A | * | 7/1956 | Rentz et al. | 43/43.1 |
| 2,766,548 A | * | 10/1956 | Willardsen | 43/43.1 |
| 2,851,816 A | * | 9/1958 | Gehrig | 43/43.1 |
| 3,012,359 A | * | 12/1961 | Foster | 43/43.14 |
| 3,076,284 A | * | 2/1963 | Adams | 43/43.1 |
| 3,082,562 A | * | 3/1963 | Duncan | 43/43.1 |
| 3,158,953 A | * | 12/1964 | Filler | 43/43.14 |
| 3,221,434 A | * | 12/1965 | Moore | 43/43.15 |
| 3,364,614 A | * | 1/1968 | Huebotter | 43/43.15 |
| 3,609,907 A | * | 10/1971 | Wiig | 43/43.15 |
| 4,413,438 A | * | 11/1983 | Hayne | 43/43.11 |
| 4,571,878 A | * | 2/1986 | Nyman | 43/43.11 |
| 4,727,676 A | * | 3/1988 | Runyan | 43/43.1 |
| 4,817,326 A | * | 4/1989 | Benjestorf | 43/43.1 |
| 5,117,574 A | * | 6/1992 | Perry | 43/42.36 |
| 5,279,066 A | * | 1/1994 | Camera | 43/43.1 |
| 5,379,543 A | * | 1/1995 | Avent | 43/42.36 |
| 5,678,351 A | * | 10/1997 | Halterman, Jr. | 43/43.15 |
| 6,405,474 B1 | * | 6/2002 | Taunton | 43/44.9 |

FOREIGN PATENT DOCUMENTS

| | | | | |
|---|---|---|---|---|
| DE | 3522381 B1 | * | 1/1987 | |
| GB | 2203622 B1 | * | 10/1988 | |
| GB | 2280830 B1 | * | 2/1995 | 43/43.1 |
| WO | WO-98/47354 B1 | * | 10/1998 | |

* cited by examiner

*Primary Examiner*—Darren W. Ark

(57) ABSTRACT

A casting device for casting a fly or other lure without the need for fly fishing tackle is provided and comprises an elongated ballasting member that has an outer body and a wire running axially through the outer body. The ballasting member is adapted for the addition of beads positioned on the wire at either end of the outer body. Two swivels are attached to either end of the ballasting member. One swivel is adapted for attachment to a spin or bait casting line and the other swivel is adapted for attachment to a leader.

18 Claims, 3 Drawing Sheets

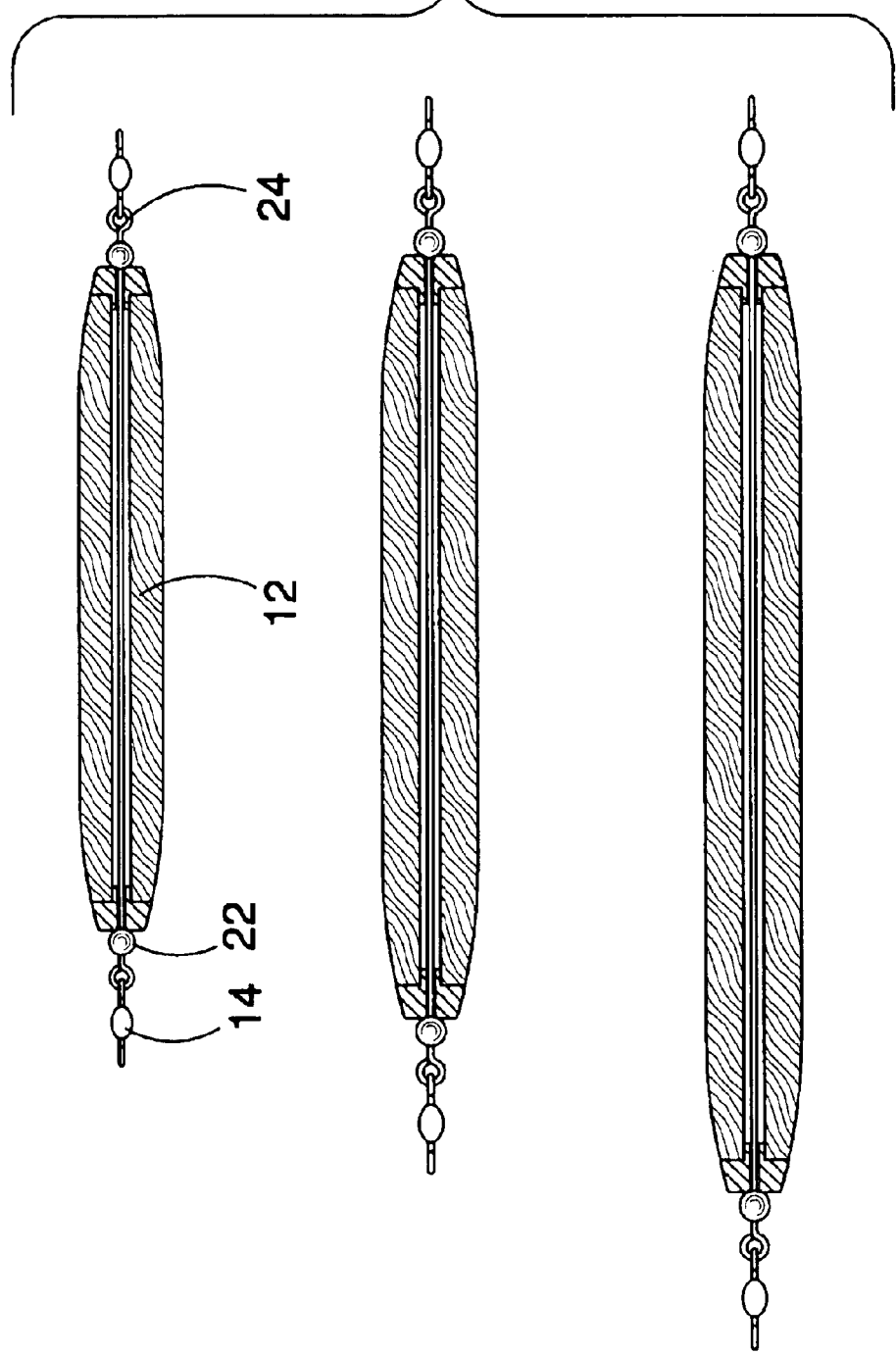

CASTING DEVICE FOR FISHING

BACKGROUND OF THE INVENTION

1. Field of the Invention

The present invention relates to fishing tackle, including a casting device for fishing for use in fly fishing. The casting device for fishing can be used with fly fishing or spinning rods and reels, allows for greater distance when casting a fly, and can be used with only a flick of the wrist.

2. Description of the Related Art

A fly fisherman uses a fish's propensity to feed on insects to interest the fish in lures that appear as insects. The fisherman tries to make his lure appear as an insect landing on the water and interest the fish into attacking it. This is done using a fly rod and fly. Unlike spinning tackle that relies on the weight of the lure or weight added to the line to load the rod and enable the fisherman to make a long cast, a fly rod uses a heavy line to load the rod and enable the cast. A short leader is connected to the end of the heavy fly line and the fly is tied to the end of the leader. The fisherman is actually casting the line, and the heavy line is pulling the fly out to the target. With standard equipment, the fly fisherman generally casts his fly about 30 feet out onto the water Fly fishing using the standard equipment causes substantial strain on the arm. A cast requires moving the entire length of the line to be cast into the air by using the weight of the line and then landing the small lure onto the water. Controlling the entire line takes considerable effort and energy from the fisherman. In contrast, when a spinning reel is used, the only weight needed to be cast into the air is that of the lure and any weights attached to it. The thin, monofilament line plays little to no part in the casting. Therefore, fishing with a spinning rod and reel is much easier in that the repetitive motion of casting does not take as much effort and causes less stress and strain on the casting arm.

If a person wants to go fly fishing, they are normally required to purchase a costly fly-fishing outfit, which include a fly reel, a ten foot casting rod plus the expensive line and lures. They then would have to cast with a form that is difficult to learn and do properly and is tiring. It is therefore advantageous to have a device that would allow a fisherman to use a standard spinning outfit with a short six foot rod to achieve the same result as the longer fly rod would accomplish.

Such a device will eliminate the need for a fisherman to purchase a special rod and reel in order to fish with a fly. A fisherman could fish in areas designated as fly fishing only and could catch fish that predominantly will be lured to the small flies.

The uses of fly fishing casting devices are known in the art. For example, U.S. Pat. No. 5,678,351 to Halterman discloses a device for casting small lures and flies with spin or bait casting equipment. This device forms a static casting loop and comprises a leading section, an intermediate weighted section and a trailing section. However, the Halterman patent does not disclose a device which can be modified with weights of various size or density to change the length of the cast, and has further drawbacks of not containing swivels which aid the device in preventing the line from becoming tangled. Further, the casting devise disclosed by Halternan is a complex combination of a leading section, a weighted section and a trailing section which is inserted between the leader and the line and can be as long as 72 inches with it's various sections. This devise can have a propensity to become tangled if not stored carefully.

U.S. Pat. No. 4,817,326 to Benjestorf discloses a set of predominantly spheroidal weighted casting bubble that can be affixed to a fishing line to add weight for casting and flotation for line retrieval. The predetermined weights of the different casting bubbles are used to moderate flotation of the casting bubbles. However, the Benjestorf patent does not disclose a device where the weight of the bubble can be modified, and additionally does not disclose an elongated ballasting device. This device serves to control flotation during retrieval and is not shown to facilitate the lure's movement to resemble that of an insect on the water.

Similarly, U.S. Pat. No. 4,413,438 to Hayne discloses a floatable fly casting weight and leader storage device that is adapted to facilitate the leader line in wrapping around the device. This devise is useful when reeling in the line in that the leader line will wrap around the weight and leader storage device. However, the Hayne patent does not allow for the modification of the device for changing the length of the cast by adding weights of various size or density, and does not have swivels to prevent the line from tangling.

U.S. Pat. No. 5,279,066 to Camera discloses an apparatus to insert in a fishing line to enhance the castability and hooking effectiveness of fishing tackle. However, the Camera patent does not allow for the modification by weights, does not have swivels, and will not facilitate the lure's movement to resemble that of an insect.

While the above-described devices fulfill their respective, particular objectives and requirements, the aforementioned patents do not describe a device that allows for the use of fly fishing tackle on either a spinning rod or a fly fishing rod that comprises an elongated device that allows for the easy modification of weights that is adapted for their attachment. The above mentioned patents make no provision for swivel connecting the device to the fishing line and do not disclose a simple elongated device that can be used for casting fly lures.

Therefore, a need exists for a new and improved casting device for fishing that can be used for increased casting distances for fly lures on either a spinning rod or a fly fishing rod. In this regard, the present invention substantially fulfills this need. In this respect, the casting device for fishing according to the present invention substantially departs from the conventional concepts and designs of the prior art, and in doing so provides an apparatus primarily developed for the purpose of increased casting distances for fly lures on either a spinning rod or a fly fishing rod.

SUMMARY OF THE INVENTION

In view of the foregoing disadvantages inherent in the known types of casting devices now present in the prior art, the present invention provides an improved casting device for fishing, and overcomes the above-mentioned disadvantages and drawbacks of the prior art. As such, the general purpose of the present invention, which will be described subsequently in greater detail, is to provide new and improved casting device for fishing and method of use which has all the advantage of the prior art mentioned heretofore and many novel features that result in a casting device for fishing which is not anticipated, rendered obvious, suggested, or even implied by the prior art, either alone or in any combination thereof.

To attain this, the present invention essentially comprises a casting device for fishing, which comprises an elongated ballasting member, which has an outer body and a wire running axially through the outer body; the ballasting member is adapted for the addition of beads positioned on the wire at either end of the outer body. Two swivels are attached to either end of the ballasting member. One swivel is adapted for attachment to a spin or bait casting line and the other swivel is adapted for attachment to a leader.

There has thus been outlined, rather broadly, the more important features of the invention in order that the detailed description thereof that follows may be better understood and in order that the present contribution to the art may be better appreciated.

The invention may also include a bead between the outer body and the first swivel and a bead between the outer body and the second swivel. There may be one, two, three, four, or more beads which can vary in size and density. The beads may be made out of plastic, metal, or any other appropriate material.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved casting device for fishing that has all of the advantages of the prior art fly fishing apparatus and none of the disadvantages.

It is another object of the present invention to provide a new and improved casting device for fishing that may be easily and efficiently manufactured and marketed.

An even further object of the present invention is to provide a new and improved casting device for fishing that has a low cost of manufacture with regard to both materials and labor, and which accordingly is then susceptible of low prices of sale to the consuming public, thereby making such casting device for fishing economically available to the buying public.

Still another object of the present invention is to provide a new casting device for fishing that provides in the apparatuses and methods of the prior art some of the advantages thereof, while simultaneously overcoming some of the disadvantages normally associated therewith.

Lastly, it is an object of the present invention to provide a new and improved method of fly fishing comprising casting a line assembly wherein the line assembly comprises: a spinning rod or fly fishing rod, a spin or bait casting line, an elongated ballasting member which has an outer body and a wire running axially through the outer body; the ballasting member is adapted for the addition of beads positioned on the wire at either end of the outer body, a swivel connecting the ballasting member to the spin or bait casting line, a second swivel connecting the ballasting member to a leader and a fly connected to the leader. The casting is done with a flick of the wrist.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view of three casting device for fishings of the present invention each having different size and weight.

The same reference numerals refer to the same parts throughout the various figures.

DESCRIPTION OF THE PREFERRED EMBODIMENT

Figure 1:
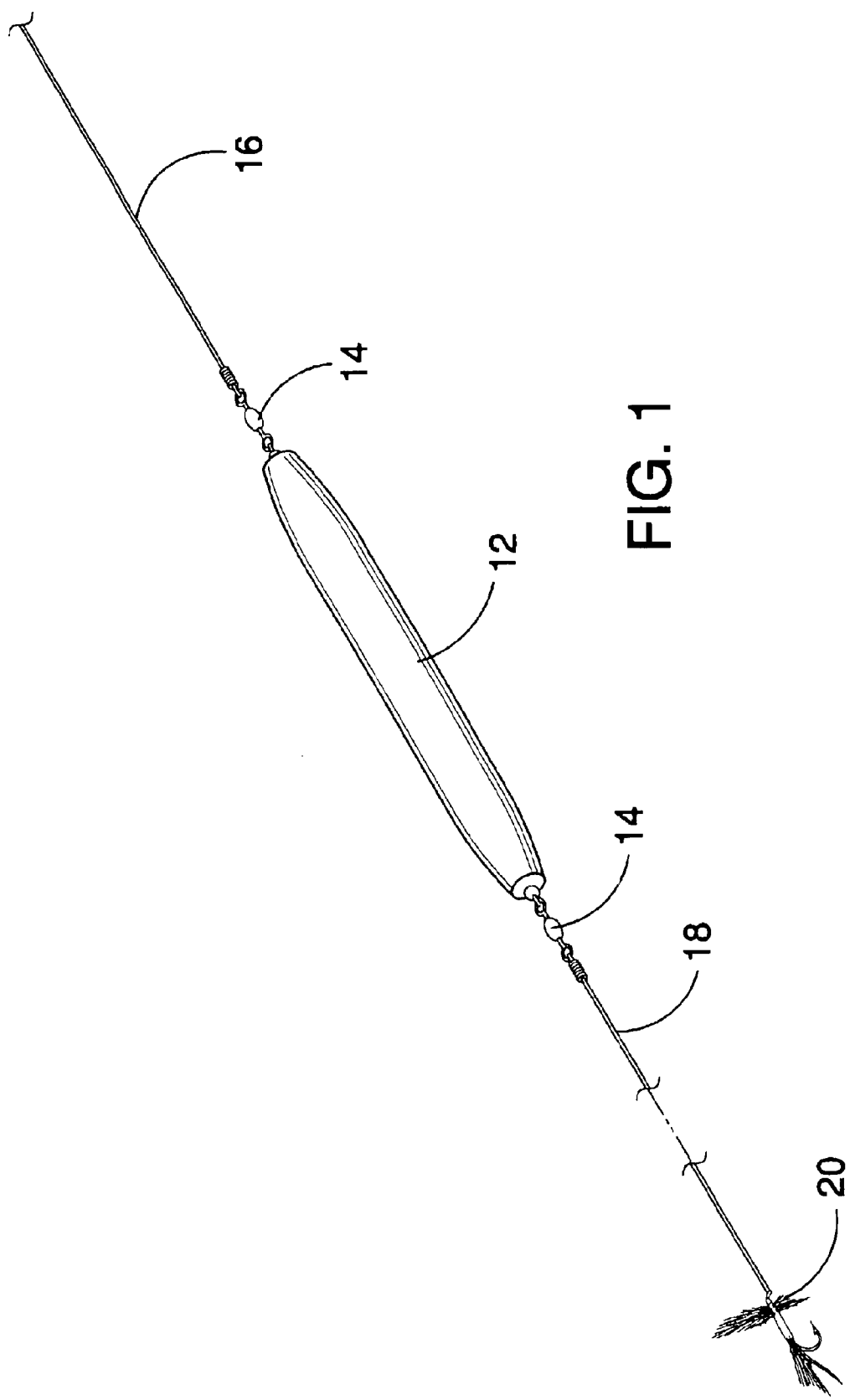
FIG. 1 is a view of a preferred embodiment of the casting device for fishing attached to a fly constructed in accordance with the principles of the present invention.
Figure 2:
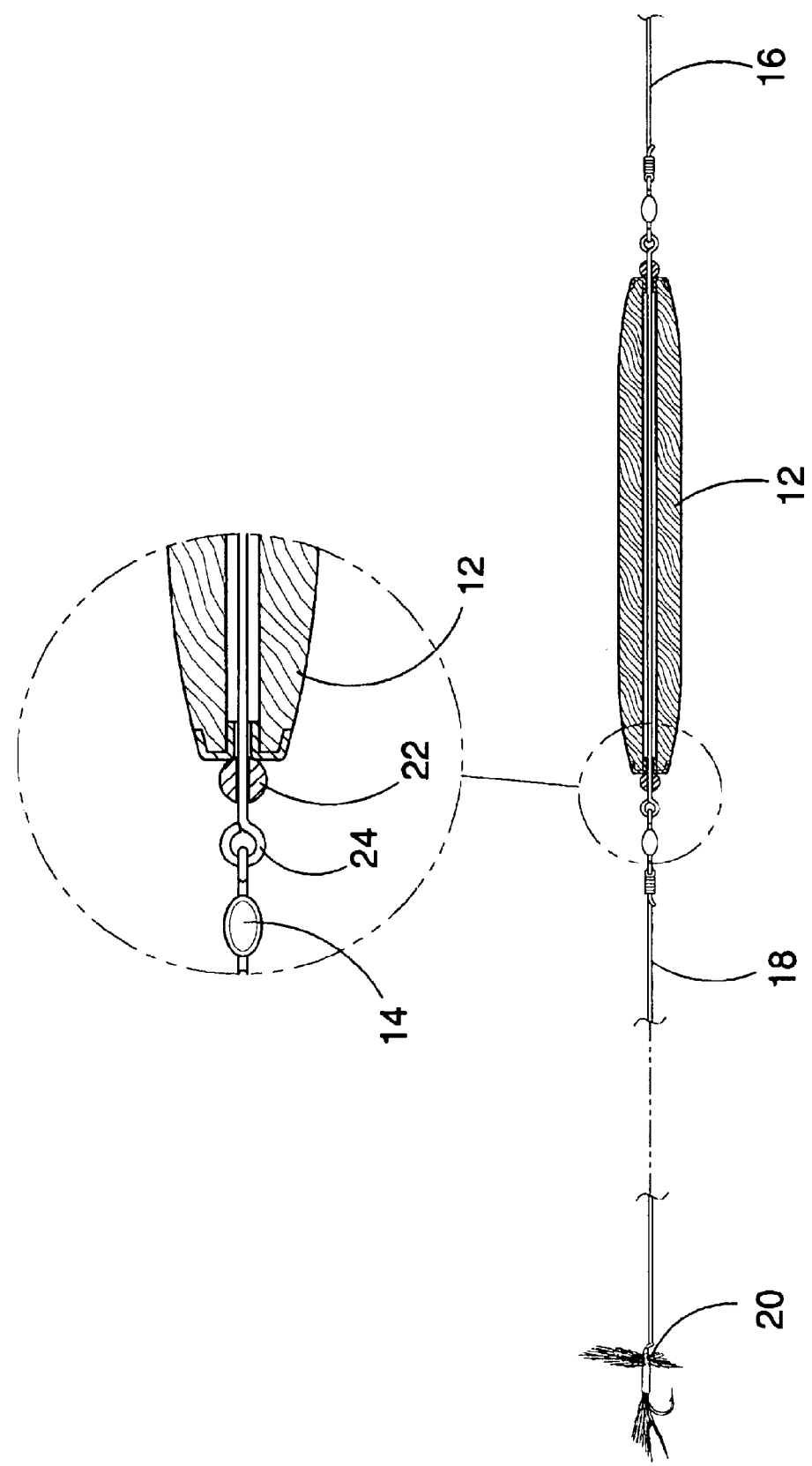
FIG. 2 is a view of the casting device for fishing of the present invention attached to a fly. The inset shows a swivel and a weighted bead.

Referring now to the drawings, and particularly to FIGS. 1–3, a preferred embodiment of the casting device for fishing of the present invention is shown and generally designated by the reference numeral 10.

In FIG. 1, a new and improved casting device for fishing 10 of the present invention for casting fly lures using either a spinning rod or a fly fishing rod is illustrated and will be described. More particularly, the casting device for fishing 10 has a ballasting member 12 that is elongated and is connected to a swivel 14 at either end of the ballasting member 12. The ballasting member 12 is preferably formed from a wooden dowel and is tapered at either end to form a torpedo-like shape.

At one end of the casting device for fishing 10, either spin or bait casting line 16 is attached to the swivel 14; the line is then attached to the spinning of fly reel. At the other end of the casting device for fishing 10, leader line 18 is attached to the swivel 14. The leader line 18 is approximately four feet in length and can be attached to a fishing lure 20. This length allows the fly to remain several feet away from the ballasting member 12 and creates a natural presentation of the fly and casting device for fishing upon the water surface. This prevents the ballasting member 12 from spooking the fish that swim up to strike the fly.

With the casting device for fishing 10 placed between the main line 16 and the leader 18, the weight of the device loads the rod and allows the fisherman to make a long, accurate cast. This system also allows the fisherman to cast his fly more than two to three times that distance, and do so with only the flick of a wrist. The increased distance available for casting allows for a greater coverage of the stream or river and a greater potential to catch fish. The ability to cast with only a wrist flicking action is important in that many fly fishermen suffer from a common ailment from the repetitive action of casting the fly fishing line.

After the casting device for fishing and fly have been cast, the casting line 16 is reeled in. As the lure moves towards the fisherman, the artificial fly looks like a live insect upon the water's surface and will cause a "V"shaped pattern on the water as it glides along.

In FIG. 2, an example of the casting device for fishing is shown in cross section such that a wire 24 can be seen running through the length of the ballasting member 12. A weighted bead 22 is depicted next to the ballasting member 12 and is on the wire 24. The swivel 14 is connected to the wire 24 portion of the ballasting member 12 to which a monofilament fishing line is attached.

One or more beads 22 may be attached for added color or for adjustment of the weight of the casting device for fishing 10. Weight is attached to either end of the casting device for fishing to give the device greater casting distance and control over the cast. The preferred size and density of the weights 22 is determined by the desired casting distance for the fly and may be adjusted for the length and density of the ballasting member 12. Heavier beads will allow for a longer cast where lighter beads or no beads at all will reduce the effort needed when repeatedly casting the casting device for fishing 10.

In FIG. 3, three casting device for fishings 10 are depicted having different lengths and weights. In one preferred embodiment, the ballasting member 12 is 2½ inches long and ⅝ inch in diameter. The length of the ballasting member 12 may by ½, 1, 1½, 2, 2½, 3, 3½, 4, 4½, 5, 5½, 6, 6½, 7 or more inches in length. It may also be an intermediate length (e.g. 1 1/16, 1⅛, 1 3/16, 1¼). The diameter of the ballasting member 12 may also be varied. In FIG. 3, each of the three casting device for fishings 10 comprises a bead 22 at either end of the ballasting member 12. These beads may be interchanged with beads of various sizes and densities in order to optimize the casting distance of the casting a line assembly.

While a preferred embodiment of the casting device for fishing has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable density material such as a variety of plastics, woods, or corks may be used instead of the wooden dowel described. Also, the beads may be made out of plastic, wood, or metal, such as lead or a more environmentally sensitive metal. And although the casting device for fishing has been described, it should be appreciated that the casting device for fishing herein described is also suitable for use with a wide variety of different lures, and is not limited to fly fishing lures.

Further, the ballasting member 12 may be painted either to attract fish to the area or to prevent the fish from becoming spooked by the presence of the ballasting member 12. The ballasting member 12 may be painted a solid color such as green or blue or may contain a pattern. One preferred color scheme for the ballasting member 12 is that of leaves floating on the water. The optional beads 22 also may be painted or otherwise colored. The beads 22 may be brightly colored, painted to match the surrounding environment, or they may not be modified.

As used herein, the term approximately means within 30%. As used herein, "a"or "an" may mean one or more. As used in the claim(s) herein, when used in conjunction with the word "comprising", the words "a"or "an"may mean one or more than one.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A casting device for fishing comprising:
    an elongated ballasting member comprising an outer body having posterior and anterior ends and a wire running axially from said anterior end to said posterior end of said outer body wherein said ballasting member is adapted for the addition of beads positioned on said wire at said anterior and posterior ends,
    a first swivel attached to said wire at said anterior end of said ballasting member, wherein said first swivel is adapted for attachment to a spin or bait casting line,
    a second swivel attached to said wire at said posterior end of said ballasting member, wherein said second swivel is adapted for attachment to a leader, and
    a bead attached to said wire between said outer body and said first swivel such that said bead is frictionally engaged with an exterior of said anterior end of said ballasting member at all times and another bead attached to said wire between said outer body and said second swivel such that said another bead is frictionally engaged with an exterior of said posterior end of said ballasting member at all times.

2. The casting device for fishing of claim 1, wherein said beads are metal.

3. The casting device for fishing of claim 1, wherein said beads are plastic.

4. The casting device for fishing of claim 1, wherein said ballasting member is 2 to 3 inches in length.

5. The casting device for fishing of claim 1, wherein said outer body of said ballasting member is painted.

6. The casting device for fishing of claim 1, wherein said outer body of said ballasting member is made out of wood.

7. The casting device for fishing of claim 1, further comprising a leader of approximately four feet.

8. The casting device for fishing of claim 1, further comprising a leader line tied to said second swivel and a fly tied to said leader line.

9. A casting device for fishing comprising:
    an elongated ballasting member comprising an outer body having posterior and anterior ends and a wire running axially from said anterior end to said posterior end of said outer body wherein said wire is a single continuous length and said ballasting member is adapted for the addition of beads positioned on said wire at said anterior and posterior ends,
    a first swivel attached to said wire at said anterior end of said ballasting member, wherein said first swivel is adapted for attachment to a spin or bait casting line, a second swivel attached to said wire at said posterior end of said ballasting member, wherein said second swivel is adapted for attachment to a leader, and a bead attached to said wire between said outer body and said first swivel such that said bead is frictionally engaged with an exterior of said anterior end of said ballasting member at all times and another bead attached to said wire between said outer body and said second swivel such that said another bead is frictionally engaged with an exterior of said posterior end of said ballasting member at all times.

10. The casting device for fishing of claim 9, further comprising a leader of approximately four feet.

11. The casting device for fishing of claim 10, wherein said outer body of said ballasting member is made out of wood.

12. The casting device for fishing of claim 11, wherein said ballasting member is 2 to 3 inches in length.

13. The casting device for fishing of claim 11, wherein said outer body of said ballasting member is painted.

14. The casting device for fishing of claim 13, wherein said beads are plastic.

15. The casting device for fishing of claim 9, further comprising a leader line tied to said second swivel and a fly tied to said leader line.

16. A method of fly fishing comprising casting a line assembly wherein said line assembly comprises:

a spinning rod or fly fishing rod, a spin or bait casting line attached to said rod, an elongated ballasting member comprising an outer body having posterior and anterior ends and a wire running axially from said anterior end to said posterior end of said outer body wherein said ballasting member is adapted for the addition of beads positioned on said wire at said anterior and posterior ends, a first swivel attached to said anterior end of said ballasting member, wherein said first swivel is connected to said spin or bait casting line, a second swivel attached to said posterior end of said ballasting member, a bead attached to said wire between said outer body and said first swivel such that said bead is frictionally engaged with an exterior of said anterior end of said ballasting member at all times and another bead attached to said wire between said outer body and said second swivel such that said another bead is frictionally engaged with an exterior of an posterior end of said ballasting member at all times, a leader attached to said second swivel, and a fly, wherein said casting is done with a flick of the wrist.

17. The method of claim 16, wherein said casting throws the fly at least 60 feet.

18. The method of claim 16, wherein said ballasting member is positioned for enhanced casting leverage.

* * * * *